Patented Sept. 11, 1928.

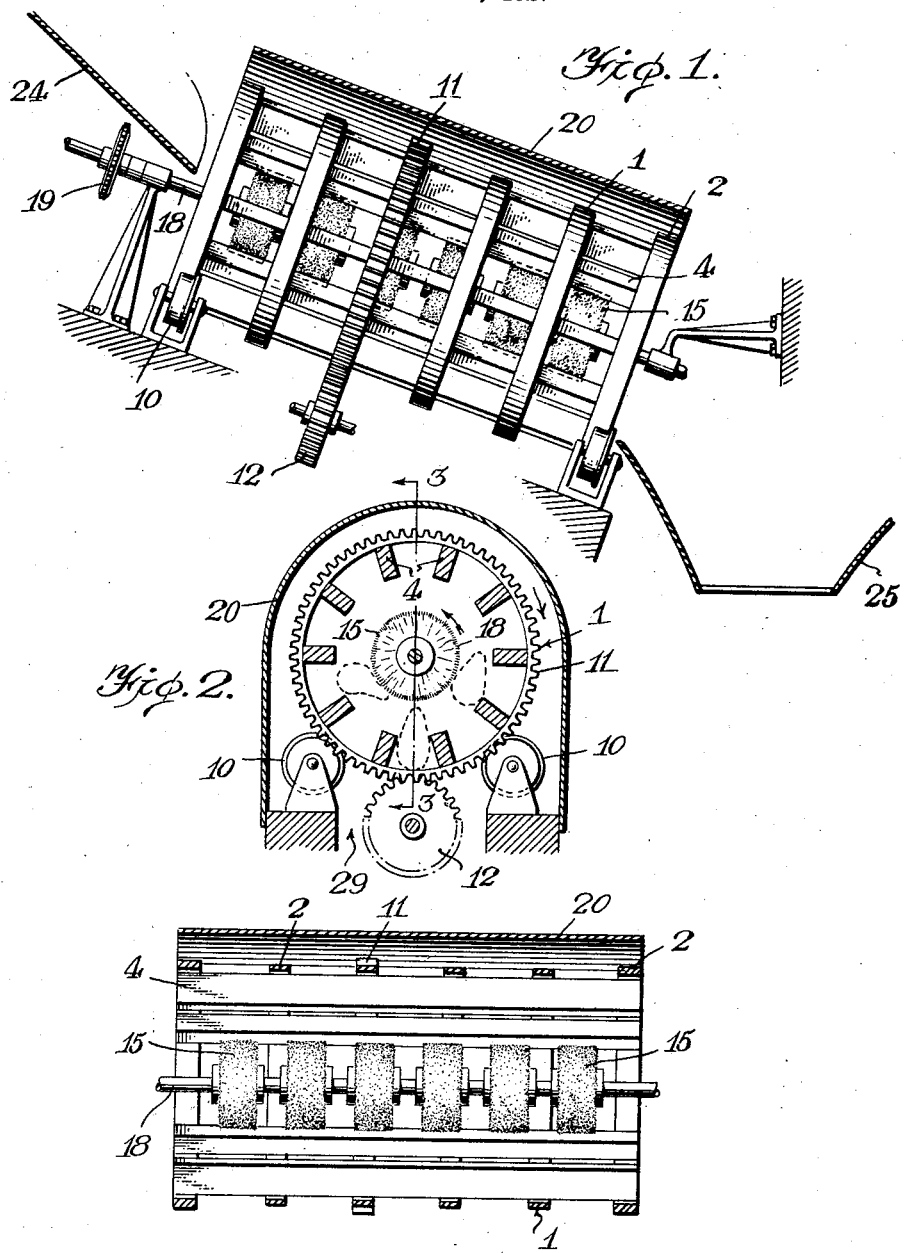

1,683,968

UNITED STATES PATENT OFFICE.

ERNEST A. GALLISON, OF WATERTOWN, MASSACHUSETTS, ASSIGNOR TO BAY STATE FISHING COMPANY, OF BOSTON, MASSACHUSETTS, A CORPORATION OF MAINE.

MACHINE FOR REMOVING SCALES FROM FISH.

Application filed February 19, 1927. Serial No. 169,625.

This invention relates to a machine for removing the scales from fish and may be conveniently located between inclined chutes which make use of gravity to convey the fish from one floor to another of a fish packing plant. Mechanical power is depended upon to rotate the scale-removing and tumbling elements of the machine, while gravity is depended upon to move the fish past the scale-removing and tumbling elements. A machine of the character disclosed herein has the advantage of being simple, having few moving parts, being adapted to handle a comparatively large number of fish and is comparatively inexpensive to manufacture and maintain.

Further objects and advantages of the invention will be apparent to those skilled in the art upon a reading of the subjoined description and claims in conjunction with the accompanying drawings, in which:

Fig. 1 is a side elevational view of the machine in its operative position with a portion of the covering hood broken away;

Fig. 2 is an elevational view of one end of the machine; and

Fig. 3 is a section on line 3—3 of Fig. 2.

The type of machine disclosed in the accompanying drawings comprises a skeletonized drum 1 which is provided with a series of peripheral hoops 2 which are spaced and connected to each other by internal radially disposed ribs or tumbler elements 4. These tumbler elements provide a series of circumferentially disposed channels opening toward the center of the drum 1. The drum is supported with its axis inclined preferably at an angle substantially of the order shown in Fig. 1. For this purpose, I provide pairs of flanged supporting wheels 10 which engage certain hoops 2 and keep the drum from sliding endwise due to its inclined position. Secured to one of the intermediate hoops 2 is a large ring gear 11 which meshes with any suitable driving gear 12 and thus provides means for rotating the drum 1.

Located along the axis of the drum are a series of scale-removing elements 15. These elements may preferably be in the form of brushes having comparatively stiff spills of metal and are mounted upon a shaft 18 which passes through the drum and is driven by any suitable driving gear or sprocket 19. Preferably the gearing 11—12 and the shaft 18 are arranged to rotate the scale-removing elements and the drum 1 with the tumbler elements 4 in opposite directions as indicated by the curved arrows of Fig. 2.

A hood 20 of sheet metal or other suitable material is located above the skeleton drum 1 in order to prevent scales from flying out upon surrounding objects. Preferably on opening 29 is left between supporting wheels 10 beneath the drum in order to permit scales passing between ribs 4 to drop to a point below the machine from which they may be removed in any desired manner. The ends of the hood 20 are left open to permit the movement of fish into and out of the scale-removing machine. For this purpose I have arranged the inclined chute 24 at the inlet of the machine and the hopper 25 at the outlet of the machine.

In the operation of a scale removing machine of this character it is to be understood that fish will be fed to the machine manually or by the inclined chute 24 which will give them considerable impetus in the direction of inclination of the chute. The fish are received in the annular space between the tumbler members 4 and the scale-removing elements 15. Rotation of the drum 1 in one direction and of the scale-removing elements 15 in the opposite direction tends to turn the fish about and expose various portions of the body thereof to the action of the scale-removing elements. Fish which drop from the brushes 15 into the channel between ribs 4, will be carried upward by the rotary movement of the drum to a position wherein they are again dropped upon the scale-removing elements. The spaces between the hoops and ribs of the skeletonized drum permit the scales to be thrown onwardly and to pass downwardly through opening 29. Frictional engagement of the fish with the brushes and tumbler elements retards the movement of the fish through the machine so that sufficient opportunity is afforded for removing the scales. Obviously the number, character and disposition of the scale-removing elements in relation to the tumbler elements 4 may be varied and adjusted to suit various kinds of fish. The fish having been tumbled by the motion of the drum 1 and having been acted on by the spills of brushes 15, pass out of the opening at the lower end of the drum 1 and into the hopper 25 or any convenient receptacle from which point they may be transported to the region where succeeding dressing and packing operations take place.

I claim:

1. A fish scaling machine comprising a rotatable skeletonized drum, a series of internal ribs about the periphery of said skeleton drum, said ribs being spaced from each other at a distance of the order of a transverse dimension of a fish of the character to be scaled, a central brush element arranged substantially concentrically in relation to said ribs, and means for providing relative rotation between the drum and brush element.

2. A fish scaling machine comprising a skeletonized drum, said drum having a downwardly inclined axis, brushes arranged along said axis, internal ribs radially disposed upon said skeleton drum, said ribs being spaced from each other at a distance of the order of a transverse dimension of a fish of the character to be scaled, and means for providing relative rotation between the drum and the brush element.

3. A fish scaling machine comprising a skeletonized drum, said drum having a downwardly inclined axis, a brush element arranged along said axis, internal tumbler elements radially disposed upon said skeleton drum, means for providing relative rotation between the drum and the brush element, and an inclined feed chute adjoining the upper end of the drum.

4. A fish scaling machine comprising a skeletonized drum, said drum having a downwardly inclined axis, a brush element arranged along said axis, internal ribs radially disposed upon said skeletonized drum, said ribs being spaced from each other at a distance of the order of a transverse dimension of a fish of the character to be scaled, means for providing relative rotation between the drum and the brush element, and a hood located about and spaced from the drum.

5. A fish scaling machine comprising a skeletonized drum, said drum having a downwardly inclined axis, a brush element arranged along said axis, internal ribs radially disposed upon said skeleton drum, said ribs being spaced from each other at a distance of the order of a transverse dimension of a fish of the character to be scaled, means for providing relative rotation between the drum and the brush element, a hood located about and spaced from the drum, and an outlet at the lower part of said hood to receive scales removed from fish passing through the machine.

6. A fish scaling machine comprising a skeletonized drum having its central axis inclined, a plurality of brushes arranged about its axis, ribs upon the drum spaced from the brushes, said ribs being spaced from each other at a distance of the order of a transverse dimension of a fish of the character to be scaled, and means for rotating the drum and brushes respectively.

7. A fish scaling machine comprising a skeletonized drum having its central axis inclined, a plurality of brushes arranged about its axis, internal ribs upon the drum spaced from the brushes, said ribs being spaced from each other at a distance of the order of a transverse dimension of a fish of the character to be scaled, and means for providing and permitting relative rotation between the drum and brushes, said means including a driving gear engaging a ring gear upon the periphery of the drum, and a plurality of support rolls engaging circumferential rims upon the drum.

8. A fish scaling machine comprising a skeletonized drum having its central axis inclined, a plurality of brushes arranged about its axis, internal ribs upon the drum spaced from the brushes, said ribs being spaced from each other at a distance of the order of a transverse dimension of a fish of the character to be scaled, and means for providing relative rotation between the drum and brushes, said means including a driving member for rotating the brush element.

9. A fish scaling machine comprising a skeletonized drum having its central axis inclined, a plurality of brushes arranged about its axis, internal ribs upon the drum spaced from the brushes, said ribs being spaced from each other at a distance of the order of a transverse dimension of a fish of the character to be scaled, and means for providing relative rotation between the drum and brushes, said means being arranged to effect the rotation of the drum and the brush element in opposite directions.

Signed by me at Boston, Massachusetts, this 16th day of February, 1927.

ERNEST A. GALLISON.